US008316023B2

(12) United States Patent
Cole

(10) Patent No.: US 8,316,023 B2
(45) Date of Patent: Nov. 20, 2012

(54) DATA MANAGEMENT SYSTEM

(75) Inventor: Patrick L. Cole, Bedford, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 417 days.

(21) Appl. No.: 12/533,916

(22) Filed: Jul. 31, 2009

(65) Prior Publication Data

US 2011/0029535 A1 Feb. 3, 2011

(51) Int. Cl.
G06F 7/00 (2006.01)
G06F 17/30 (2006.01)

(52) U.S. Cl. ....................................... 707/736
(58) Field of Classification Search .................. 707/736, 707/999.101

See application file for complete search history.

(56) References Cited

U.S. PATENT DOCUMENTS

| | | | | |
|---|---|---|---|---|
| 5,822,717 | A | | 10/1998 | Tsiang et al. |
| 6,026,397 | A | * | 2/2000 | Sheppard ................ 1/1 |
| 6,421,620 | B1 | * | 7/2002 | Kotlow ................ 702/67 |
| 6,609,128 | B1 | | 8/2003 | Underwood |
| 6,643,635 | B2 | | 11/2003 | Nwabueze |
| 6,865,514 | B1 | | 3/2005 | Goguen et al. |
| 7,127,520 | B2 | * | 10/2006 | Ladd et al. ............ 709/231 |
| 7,243,341 | B2 | * | 7/2007 | Murray ................ 717/136 |
| 7,290,048 | B1 | * | 10/2007 | Barnett et al. ........... 709/223 |
| 7,325,160 | B2 | * | 1/2008 | Tsao ................ 714/15 |
| 7,571,151 | B1 | * | 8/2009 | Fontaine ................ 1/1 |
| 7,584,422 | B2 | * | 9/2009 | Ben-Yehuda et al. ...... 715/236 |
| 2002/0169735 | A1 | * | 11/2002 | Kil et al. ............ 706/46 |
| 2004/0167908 | A1 | * | 8/2004 | Wakefield et al. ........ 707/100 |
| 2004/0243631 | A1 | | 12/2004 | Walker et al. |
| 2005/0033719 | A1 | | 2/2005 | Tirpak et al. |
| 2005/0165731 | A1 | | 7/2005 | Funk |
| 2005/0246353 | A1 | * | 11/2005 | Ezer et al. ............ 707/100 |
| 2006/0106789 | A1 | * | 5/2006 | Fernandez ............ 707/4 |
| 2006/0271582 | A1 | | 11/2006 | Collins |
| 2007/0255731 | A1 | | 11/2007 | Maze |
| 2008/0028340 | A1 | * | 1/2008 | Davis ................ 715/853 |
| 2009/0300054 | A1 | * | 12/2009 | Fisher et al. ............ 707/102 |
| 2010/0005115 | A1 | * | 1/2010 | Richter et al. ........... 707/101 |

OTHER PUBLICATIONS

Zhao et al, "A Notation and System for Expressing and Executing Cleanly Typed Workflows on Messy Scientific Data", 2005, SIGMOD Record, vol. 34, No. 3.*

* cited by examiner

*Primary Examiner* — Brannon W Smith
(74) *Attorney, Agent, or Firm* — Christopher A. Monsey

(57) ABSTRACT

A computer implemented system for processing selected data from a raw data file having a plurality of data sets arranged according to a repeating fixed format includes a plurality of processing sequences. A first sequence creates output files, each corresponding to a data set and having a common format, by sequentially processing the data sets according to a first meta-program. A second sequence generates a first data structure by processing each output file according to a second meta-program, the first data structure including data arrangements corresponding to the output files. A third sequence generates a second data structure by processing the first data structure according to a third meta-program, the second data structure including a tabular arrangement of data including data from each data arrangement. A fourth sequence processes the second data structure and provides an output configured to facilitate analysis of the data.

8 Claims, 14 Drawing Sheets

| Test Name | Status | **Section-1  Value Last Test | | Section-2  Value Last Test | | Section-3  Value Last Test | | Section-4**  Value Last Test | | Low | to High | Unit |
|---|---|---|---|---|---|---|---|---|---|---|---|---|
| | | | 008,019,032,043,056,067,080,091,103,110,119 | | | | | | | | | |
| Ips 2 | Pass | 0.8689 | Pass | | | | | | | 0.25 | to 8 | mA |
| Ips 3 | Pass | -0.931 | Pass | | | | | | | -8 | to -0.25 | mA |
| Vos | Pass | -1.763 | Pass | -2.042 | Pass | -1.930 | Pass | -1.773 | Pass | 0 | to 10 | mV |
| Ios | Pass | 0.0091 | Pass | 0.1475 | Pass | 0.0463 | Pass | 0.2341 | Pass | 0 | to 7 | nA |
| +Ib | Pass | -10.97 | Pass | -10.94 | Pass | -10.61 | Pass | -10.60 | Pass | 0 | to 70 | nA |
| -Ib | Pass | -10.97 | Pass | -11.06 | Pass | -10.66 | Pass | -10.80 | Pass | 0 | to 70 | nA |
| Ib | Pass | -12.07 | Pass | -12.10 | Pass | -11.68 | Pass | -11.77 | Pass | 0 | to 700 | nA |
| Av | Pass | 290.27 | Pass | 273.34 | Pass | 280.34 | Pass | 292.86 | Pass | 200 | to 3200 | V/mV |
| PSRR | Pass | 112.35 | Pass | 124.39 | Pass | 118.37 | Pass | 108.83 | Pass | 40 | to 150 | dB |
| CMRR | Pass | 103.56 | Pass | 104.39 | Pass | 104.39 | Pass | 102.81 | Pass | 40 | to 150 | dB |
| Voh | Pass | 13.752 | Pass | 13.765 | Pass | 13.769 | Pass | 13.777 | Pass | 7 | to 15 | Volt |
| Vol | Pass | -14.11 | Pass | -14.14 | Pass | -14.14 | Pass | -14.14 | Pass | -15 | to -7 | Volt |
| Ioh | Pass | -42.32 | Pass | -41.49 | Pass | -41.91 | Pass | -43.16 | Pass | -60 | to -5 | mA |
| Iol | Pass | 25.119 | Pass | 25.904 | Pass | 26.790 | Pass | 26.811 | Pass | 5 | to 60 | mA |
| Slew+ | Pass | 0.2974 | Pass | 0.2549 | Pass | 0.2753 | Pass | 0.2827 | Pass | 0.2 | to 20 | V/us |
| Slew- | Pass | 0.2701 | Pass | 0.2735 | Pass | 0.2618 | Pass | 0.2614 | Pass | 0.2 | to 20 | V/us |

Total Pass = 1   Total Fail = 0   Serial Number = W16_001 1

Total Pass = 2    Total Fail = 0    Serial Number = W16_002 1 — 106

| Parameter | 112A | 110A | 112B | 110B | 112C | 110C | 112D | 110D | Low | High | Units |
|---|---|---|---|---|---|---|---|---|---|---|---|
| Ips 2 | Pass | 0.8793 | Pass |  | Pass |  | Pass |  | 0.25 | to 8 | mA |
| Ips 3 | Pass | -0.941 | Pass |  | Pass |  | Pass |  | -8 | to -0.25 | mA |
| Vos | Pass | -2.092 | Pass | -2.163 | Pass | -1.824 | Pass | -2.021 | 0 | to 10 | mV |
| Ios | Pass | 0.2377 | Pass | 0.1621 | Pass | -0.028 | Pass | 0.1530 | 0 | to 7 | nA |
| +Ib | Pass | -11.35 | Pass | -11.55 | Pass | -11.23 | Pass | -11.04 | 0 | to 70 | nA |
| -Ib | Pass | -11.57 | Pass | -11.71 | Pass | -11.21 | Pass | -11.19 | 0 | to 70 | nA |
| Ib | Pass | -12.62 | Pass | -12.77 | Pass | -12.34 | Pass | -12.22 | 0 | to 700 | nA |
| Av | Pass | 298.18 | Pass | 285.22 | Pass | 292.86 | Pass | 300.92 | 200 | to 3200 | V/mV |
| PSRR | Pass | 124.39 | Pass | 124.39 | Pass | 124.39 | Pass | 124.39 | 40 | to 150 | dB |
| CMRR | Pass | 107.49 | Pass | 105.31 | Pass | 105.31 | Pass | 103.56 | 40 | to 150 | dB |
| Voh | Pass | 13.756 | Pass | 13.770 | Pass | 13.774 | Pass | 13.779 | 7 | to 15 | Volt |
| Vol | Pass | -14.11 | Pass | -14.14 | Pass | -14.14 | Pass | -14.14 | -15 | to -7 | Volt |
| Ioh | Pass | -42.12 | Pass | -41.39 | Pass | -42.50 | Pass | -42.34 | -60 | to -5 | mA |
| Iol | Pass | 24.857 | Pass | 25.662 | Pass | 26.569 | Pass | 26.408 | 5 | to 60 | mA |
| Slew+ | Pass | 0.3030 | Pass | 0.2616 | Pass | 0.2863 | Pass | 0.2895 | 0.2 | to 20 | V/us |
| Slew- | Pass | 0.2762 | Pass | 0.2802 | Pass | 0.2683 | Pass | 0.2669 | 0.2 | to 20 | V/us |

104C

008,019,032,043,056,067,080,091,103,110,119

| Parameter | | 110A | | 110B | | 110C | | 110D | Low | High | Units |
|---|---|---|---|---|---|---|---|---|---|---|---|
| Ips 2 | Pass | 0.8689 | Pass |  | Pass |  | Pass |  | 0.25 | to 8 | mA |
| Ips 3 | Pass | -0.931 | Pass |  | Pass |  | Pass |  | -8 | to -0.25 | mA |
| Vos | Pass | -2.023 | Pass | -1.995 | Pass | -1.854 | Pass | -2.098 | 0 | to 10 | mV |
| Ios | Pass | 0.1304 | Pass | 0.2036 | Pass | -0.057 | Pass | 0.1506 | 0 | to 7 | nA |
| +Ib | Pass | -10.92 | Pass | -11.03 | Pass | -10.86 | Pass | -10.01 | 0 | to 70 | nA |
| -Ib | Pass | -11.03 | Pass | -11.21 | Pass | -10.82 | Pass | -10.15 | 0 | to 70 | nA — 116 |

108 — 114

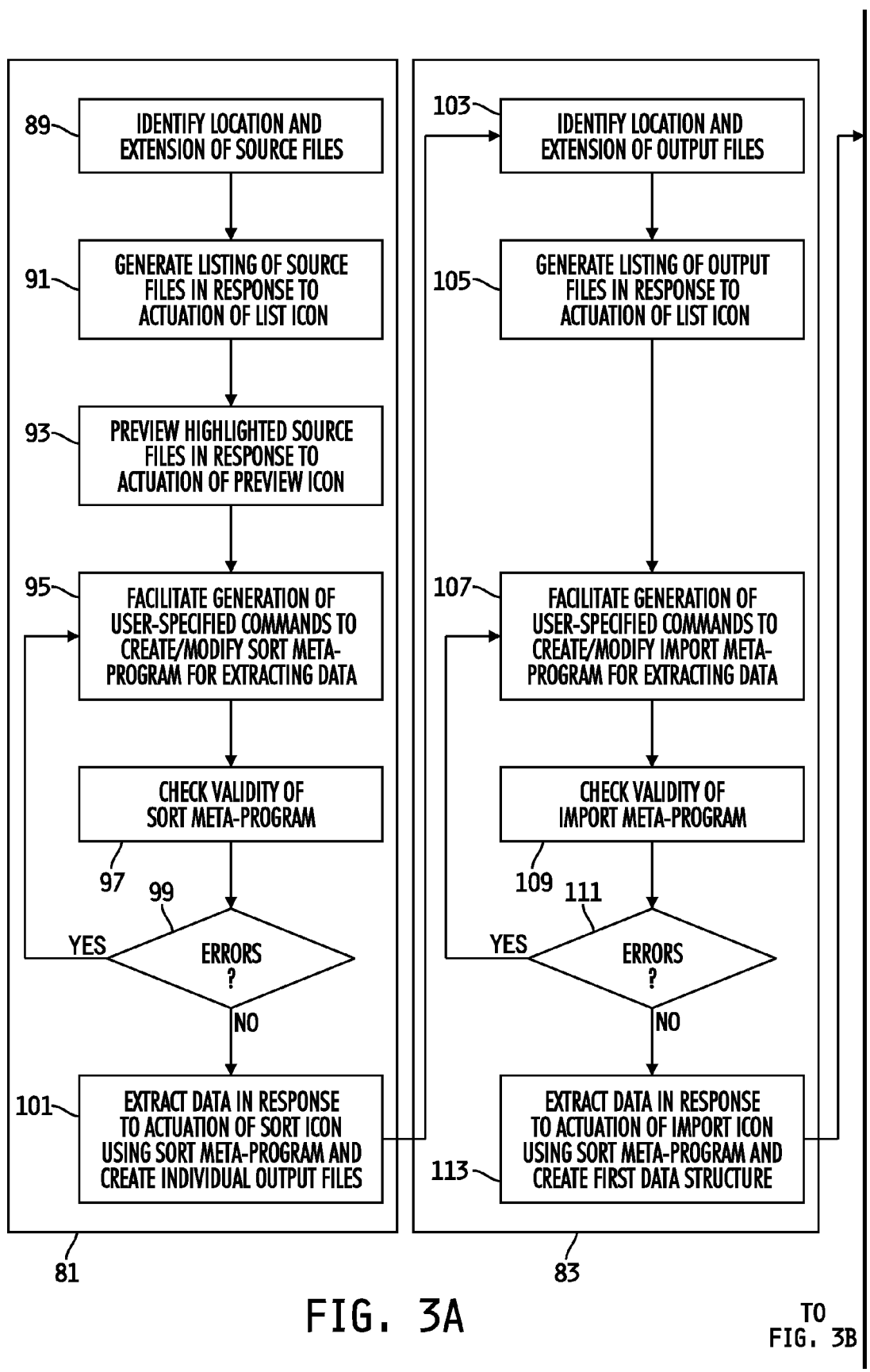

| Parameter | | | | | | | | | | Min | Max | Units |
|---|---|---|---|---|---|---|---|---|---|---|---|---|
| Ips 2 | Pass | 0.8689 | | | | | | | | 0.25 | to 8 | mA |
| Ips 3 | Pass | -0.931 | | | | | | | | -8 | to -0.25 | mA |
| Vos | Pass | -1.763 | Pass | -2.042 | Pass | -1.930 | Pass | -1.773 | | 0 | to 10 | mV |
| Ios | Pass | 0.0091 | Pass | 0.1475 | Pass | 0.0463 | Pass | 0.2341 | | 0 | to 7 | nA |
| +Ib | Pass | -10.97 | Pass | -10.94 | Pass | -10.61 | Pass | -10.60 | | 0 | to 70 | nA |
| -Ib | Pass | -10.97 | Pass | -11.06 | Pass | -10.66 | Pass | -10.80 | | 0 | to 70 | nA |
| Ib | Pass | -12.07 | Pass | -12.10 | Pass | -11.68 | Pass | -11.77 | | 0 | to 700 | nA |
| Av | Pass | 290.27 | Pass | 273.34 | Pass | 280.34 | Pass | 292.86 | | 200 | to 3200 | V/mV |
| PSRR | Pass | 112.35 | Pass | 124.39 | Pass | 118.37 | Pass | 108.83 | | 40 | to 150 | dB |
| CMRR | Pass | 103.56 | Pass | 104.39 | Pass | 104.39 | Pass | 102.81 | | 40 | to 150 | dB |
| Voh | Pass | 13.752 | Pass | 13.765 | Pass | 13.769 | Pass | 13.777 | | 7 | to 15 | Volt |
| Vol | Pass | -14.11 | Pass | -14.14 | Pass | -14.14 | Pass | -14.14 | | -15 | to -7 | Volt |
| Ioh | Pass | -42.32 | Pass | -41.49 | Pass | -41.91 | Pass | -43.16 | | -60 | to -5 | mA |
| Iol | Pass | 25.119 | Pass | 25.904 | Pass | 26.790 | Pass | 26.811 | | 5 | to 60 | mA |
| Slew+ | Pass | 0.2974 | Pass | 0.2549 | Pass | 0.2753 | Pass | 0.2827 | | 0.2 | to 20 | V/us |
| Slew- | Pass | 0.2701 | Pass | 0.2735 | Pass | 0.2618 | Pass | 0.2614 | | 0.2 | to 20 | V/us |

FIG. 6

| | A | B | C | D | E |
|---|---|---|---|---|---|
| 1 | XP792_1_10.out | | | | |
| 2 | Ips | 0.8689 | | | |
| 3 | Ips | -0.931 | | | |
| 4 | Vos | -2.054 | -1.981 | -1.886 | -2.113 |
| 5 | Ios | 0.1103 | 0.0963 | 0.0878 | 0.1542 |
| 6 | +Ib | -11.27 | -11.40 | -11.00 | -10.98 |
| 7 | -Ib | -11.37 | -11.49 | -11.10 | -11.11 |
| 8 | Ib | -12.46 | -12.55 | -12.13 | -12.16 |
| 9 | Av | 295.50 | 277.97 | 290.27 | 300.92 |
| 10 | PSRR | 124.39 | 124.39 | 118.37 | 124.39 |
| 11 | CMRR | 105.31 | 105.31 | 105.31 | 103.56 |
| 12 | Voh | 13.754 | 13.767 | 13.769 | 13.777 |
| 13 | Vol | -14.11 | -14.14 | -14.14 | -14.14 |
| 14 | Ioh | -42.36 | -41.73 | -42.38 | -42.76 |
| 15 | Iol | 24.776 | 25.441 | 26.428 | 26.347 |
| 16 | Slew+ | 0.2982 | 0.2536 | 0.2783 | 0.2826 |
| 17 | Slew- | 0.2725 | 0.2733 | 0.2650 | 0.2635 |
| 18 | | | | | |
| 19 | XP792_1_11.out | | | | |
| 20 | Ips | 0.900 | | | |
| 21 | Ips | -0.962 | | | |
| 22 | Vos | -1.811 | -2.035 | -1.847 | -1.698 |
| 23 | Ios | -0.112 | 0.0408 | 0.1823 | 0.1823 |
| 24 | +Ib | -11.38 | -11.48 | -10.93 | -10.93 |
| 25 | -Ib | -11.28 | -11.52 | -11.10 | -11.09 |
| 26 | Ib | -12.46 | -12.65 | -12.10 | -12.10 |
| 27 | Av | 292.86 | 292.86 | 280.34 | 300.92 |
| 28 | PSRR | 114.85 | 118.37 | 124.39 | 118.37 |
| 29 | CMRR | 104.39 | 102.11 | 103.56 | 101.47 |
| 30 | Voh | 13.759 | 13.772 | 13.774 | 13.782 |
| 31 | Vol | -14.11 | -14.14 | -14.14 | -14.14 |
| 32 | Ioh | -41.83 | -41.41 | -41.53 | -43.00 |
| 33 | Iol | 25.360 | 26.206 | 26.952 | 26.992 |
| 34 | Slew+ | 0.3098 | 0.2885 | 0.2979 | 0.2989 |
| 35 | Slew- | 0.2811 | 0.2842 | 0.2728 | 0.2707 |
| 36 | | | | | |
| 37 | XP792_1_12.out | | | | |
| 38 | Ips | 0.8793 | | | |
| 39 | Ips | -0.941 | | | |
| 40 | Vos | -1.878 | -2.110 | -1.884 | -2.019 |
| 41 | Ios | 0.2554 | 0.2609 | 0.1878 | -7.316E-03 |
| 42 | +Ib | -10.92 | -10.88 | -10.69 | -10.54 |

|   | A | B | C | D | E | F |
|---|---|---|---|---|---|---|
| 1 |   |   | Source Sheet | Destination Sheet | Import Command | Parameter 1 |
| 2 |   |   | Data1 | EData1 | GPN | Vos |
| 3 |   |   |   |   | LPST |   |
| 4 |   |   |   |   | XFHL | 3 |
| 5 |   |   |   |   | ANR | 3 |
| 6 | Extract Data for Plotting |   |   |   | XYPL | 2,3,4,5 |
| 7 |   |   |   |   | FNH |   |
| 8 |   |   |   |   | LPEND |   |
| 9 |   |   |   |   |   |   |
| ... |   |   |   |   |   |   |
| 24 | Command Description | Command |   | # Parameters |   |   |
| 25 | Get Parameter Name | GPN |   |   |   |   |
| 26 | Extract x from header line | XFHL |   | 1 |   |   |
| 27 | Advance N Rows | ANR |   | 1 |   |   |
| 28 | Find Next Header | FNH |   |   |   |   |
| 29 | Extract yvals per list | XYPL |   | list |   |   |
| 30 | Loop Start | LPST |   |   |   |   |
| 31 | Loop End | LPEND |   |   |   |   |

|   | A | B | C | D | E |
|---|---|---|---|---|---|
| 1 | Vos | | | | |
| 2 | 10 | -2.054 | -1.981 | -1.886 | -2.113 |
| 3 | 11 | -1.811 | -2.035 | -1.847 | -1.698 |
| 4 | 12 | -1.878 | -2.11 | -1.884 | -2.019 |
| 5 | 13 | -2.023 | -2.113 | -1.765 | -1.974 |
| 6 | 14 | -1.989 | -1.887 | -1.913 | -1.946 |
| 7 | 15 | -2.031 | -2.182 | -1.754 | -2.049 |
| 8 | 16 | -2.057 | -2.082 | -1.84 | -2.123 |
| 9 | 17 | -1.956 | -2.048 | -1.846 | -1.932 |
| 10 | 18 | -2.207 | -2.009 | -2.121 | -1.726 |
| 11 | 19 | -2.006 | -2.13 | -2.099 | -2.076 |

| | A | B | C | D | E | F |
|---|---|---|---|---|---|---|
| 1 | Sheet | | Property | Setting/Value | x-data | y-data |
| 2 | EData1 | | Title | XP792 Voltage Offset | 1 | 3 |
| 3 | | | xLabel | Stress | | |
| 4 | | | yLabel | Volts | | |
| 5 | | | xMin | 10 | | |
| 6 | | Plot new chart | xMax | 20 | | |
| 7 | | | yMin | -1.5 | | |
| 8 | | | yMax | -2.5 | | |
| 9 | | | xLog | 0 | | |
| 10 | | Add data to existing chart | yLog | 0 | | |
| 11 | | | xZeroInt | 0 | | |
| 12 | | | yZeroInt | 0 | | |
| 13 | | | nColorGroup | 1 | | |
| 14 | | | GraphName | XP792 | | |
| 15 | | | npts | 10 | | |

DATA MANAGEMENT SYSTEM

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

FIELD OF THE DISCLOSURE

The present disclosure relates generally to methods and systems for managing large quantities of data, and more particularly to methods and systems for processing raw data files to generate output information in a format that facilitates evaluation and analysis of the underlying data.

BACKGROUND AND SUMMARY OF THE DISCLOSURE

In a variety of different contexts, it is desirable to process raw data for evaluation and analysis. For small data sets, the underlying data is typically processed manually. The data is rearranged or modified to support, in many instances, graphical representations of the data to facilitate evaluation and analysis. When the quantities of data for analysis become very large, however, manual processing of the data becomes cumbersome and time consuming.

The present disclosure provides a method and system for managing large quantities of data by user configurable automation. In one embodiment, a computer implemented system is provided for processing selected data from a raw data file having a plurality of data sets arranged according to a repeating fixed format. The system includes a first processing sequence that creates output files, each corresponding to a data set and having a common format, by sequentially processing the data sets according to a first meta-program. A second sequence generates a first data structure by processing each output file according to a second meta-program, the first data structure including data arrangements corresponding to the output files. A third sequence generates a second data structure by processing the first data structure according to a third meta-program, the second data structure including a tabular arrangement of data including data from each data arrangement. A fourth sequence processes the second data structure and provides an output configured to facilitate analysis of the data.

These and other features of the present disclosure will become more apparent and the subject matter of the disclosure will be better understood by reference to the following description of embodiments of the disclosure taken in conjunction with the accompanying drawings.

BRIEF DESCRIPTION OF THE DRAWINGS

FIGS. 1A, 1B, and 1C are an example of a raw data file of the type operated on using the principles of the present disclosure.

FIGS. 3A and 3B are a high-level block diagram of the various elements of a system according to one embodiment of the present disclosure;

FIG. 6 is an output file generated using the sort page of FIG. 4.

FIG. 7 is a data arrangement generated using the import page of FIG. 5.

FIG. 8 is a screenshot of an extract page according to one embodiment of the present disclosure.

FIG. 9 is an output file created using the extract page of FIG. 8.

FIG. 10 is a screenshot of a plot page according to one embodiment of the present disclosure.

FIG. 11 is a screenshot of an analyze page according to one embodiment of the present disclosure.

Figure 1A:
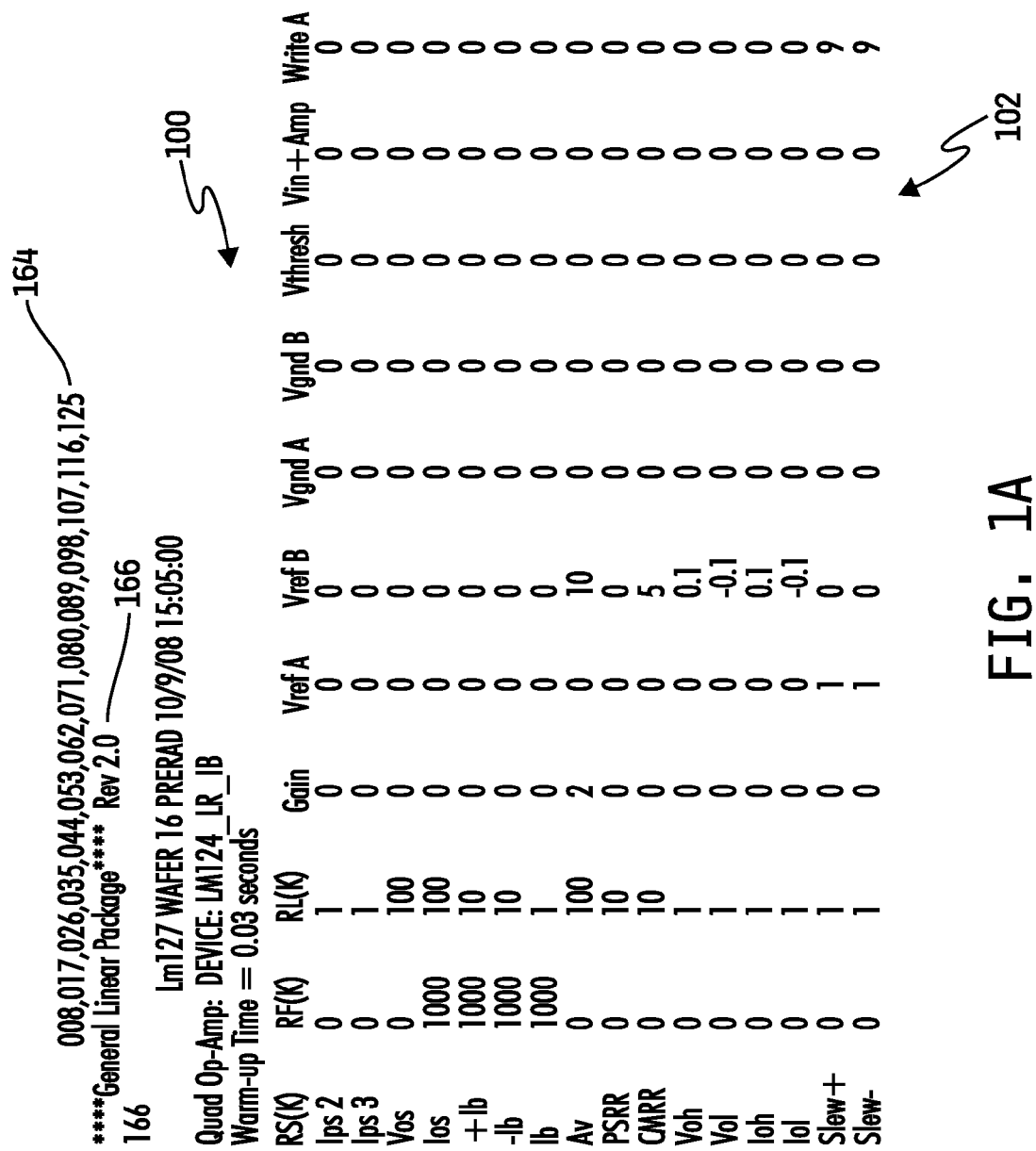

Although the drawings represent embodiments of various features and components according to the present invention, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the disclosure in any manner.

DETAILED DESCRIPTION OF EMBODIMENTS OF THE DISCLOSURE

For the purposes of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated system and described method and further applications of the principles of the disclosure, which would normally occur to one skilled in the art to which the disclosure relates. Moreover, the embodiments were selected for description to enable one of ordinary skill in the art to practice and implement the principles described herein.

The method and system of the present disclosure are configured to operate on raw data files generated by any of a variety of different methods and devices. For example, a raw data file may be generated by a testing device such as an Eagle Model LT-4 which is a conventional integrated circuit testing device configured to accept integrated circuits of various package configurations, to apply test signals to input pins of the integrated circuits, and to obtain measurements of output signals and other parameters. The testing device further generates output files containing the various measurements taken during the testing operation. Any other method or device may be used to generate raw data files corresponding to data representing measurements or other parameters of other test items. The raw data files may be generated manually, or otherwise created using measurement or sampling techniques to collect data representing parameters of interest for the test item.

In general, the raw data files suitable for processing using the principles of the present disclosure share the characteristic of having a fixed format for arranging the raw data. The present disclosure has particular applicability to raw data files containing repetitive sets of data, wherein each data set corresponds to an individual item. The items corresponding to the data sets in the raw data files may be separate tests or other data collection processes on one test object, or separate tests or other data collection processes on multiple test objects, each test corresponding to a different test object. The repetitive data sets are arranged in the raw data file in a repeating format such that each data set is identifiable by its location within the predefined format. For example, each data set may be followed by an item identifier, such as a serial number, with the test data corresponding to the item following the item identifier in a fixed arrangement. The raw data file may further include header information and end-of-file information, as well as other information describing, for example, the conditions or environment under which the data was collected. In general, raw data files are stored on a computing device in a particular folder or directory, with a file name and extension that provides an indication of the type of data included in the raw data files.

FIGS. 1A, 1B, and 1C are an example of a portion of one such raw data file. As shown, data file 100 includes a block of header information 102 followed by a plurality of data sets 104A, 104B, etc. Each data set 104 is followed by an item identifier 106. In this example, the item identifier 106 corresponds to the serial number of an integrated circuit including a plurality of operational amplifiers. Each data set 104 further includes a parameter name column 108, and four data columns 110A, 110B, 110C, 110D, each having a corresponding pass/fail indicator column 112A, 112B, 112C, 112D. In this example, each data column 110 corresponds to one operational amplifier contained in the integrated circuit being tested. As should be apparent from the figure, the integrated circuit under test in this example includes four operational amplifiers. Each data set 104 further includes a range column 114 and a units column 116. Range column 114 includes a predefined range of values (in units corresponding to the associated units column 116 value) against which the data in the data columns are compared to yield the pass/fail determination indicated in pass/fail indicator columns 112. Thus, for data set 104A and the parameter name "Vos" in parameter name column 108, the data value for the first operational amplifier in data column 110A is "−1.763." As this value is between the range 0 to 10 mV as indicated in the range column 114 and units column 116 corresponding to the Vos parameter, pass/fail indicator column 112A corresponding to the first operational amplifier includes the designation "Pass." Moving across data set 104A, the values for the other three operational amplifiers also fall within the designated parameter range, thereby resulting in a "Pass" designation for each data column 110B, 110C, 110D. The above-described format is followed in a repetitive fashion for each data set 104 included in the remainder of raw data file 100.

Figure 2:
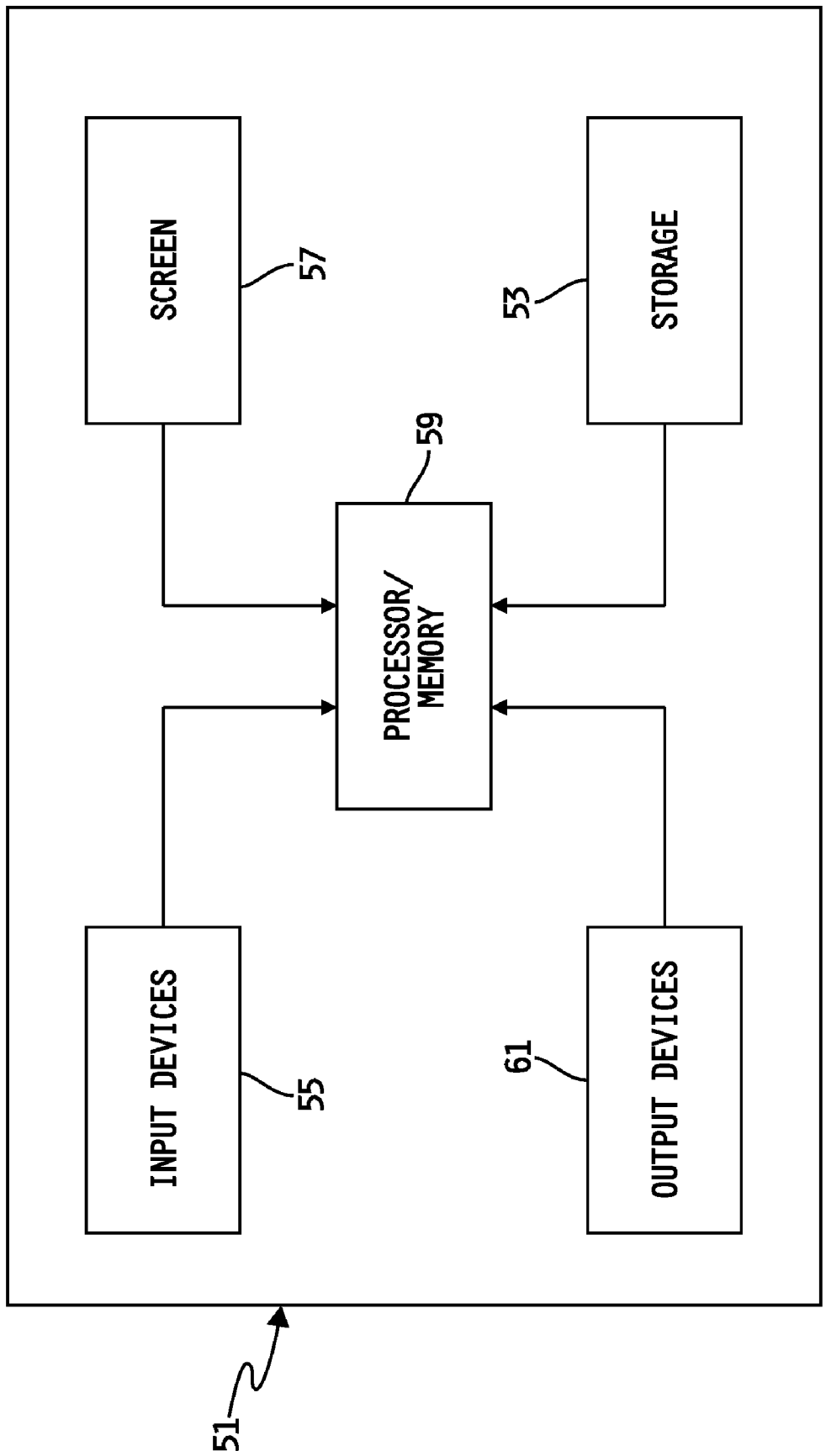
FIG. 2 is a conceptual diagram of a system according to one embodiment of the present disclosure.

Referring now to FIG. 2, a computer system 51 employing an embodiment of the invention is shown. System 51 includes a storage device/medium 53 which stores the various processing sequences, data structures, command definitions and other required data elements as described below. Inputs to system 51 are made through input devices 55 to specify file names, specify command names and parameter values, and actuate function icons. The screen 57 can display status, commands and results associated with the present system. The processor/memory 59 executes commands, generates the various graphical user interfaces, and manipulates data in accordance with the user-specified meta-programs. The output devices 61 may include a printer that outputs graphical representations of processed data or other data, including the raw data files, output files and various data arrangements temporarily stored by system 51. Output information or data can also be stored into a data storage medium or transferred to other computer systems.

Figure 3B:
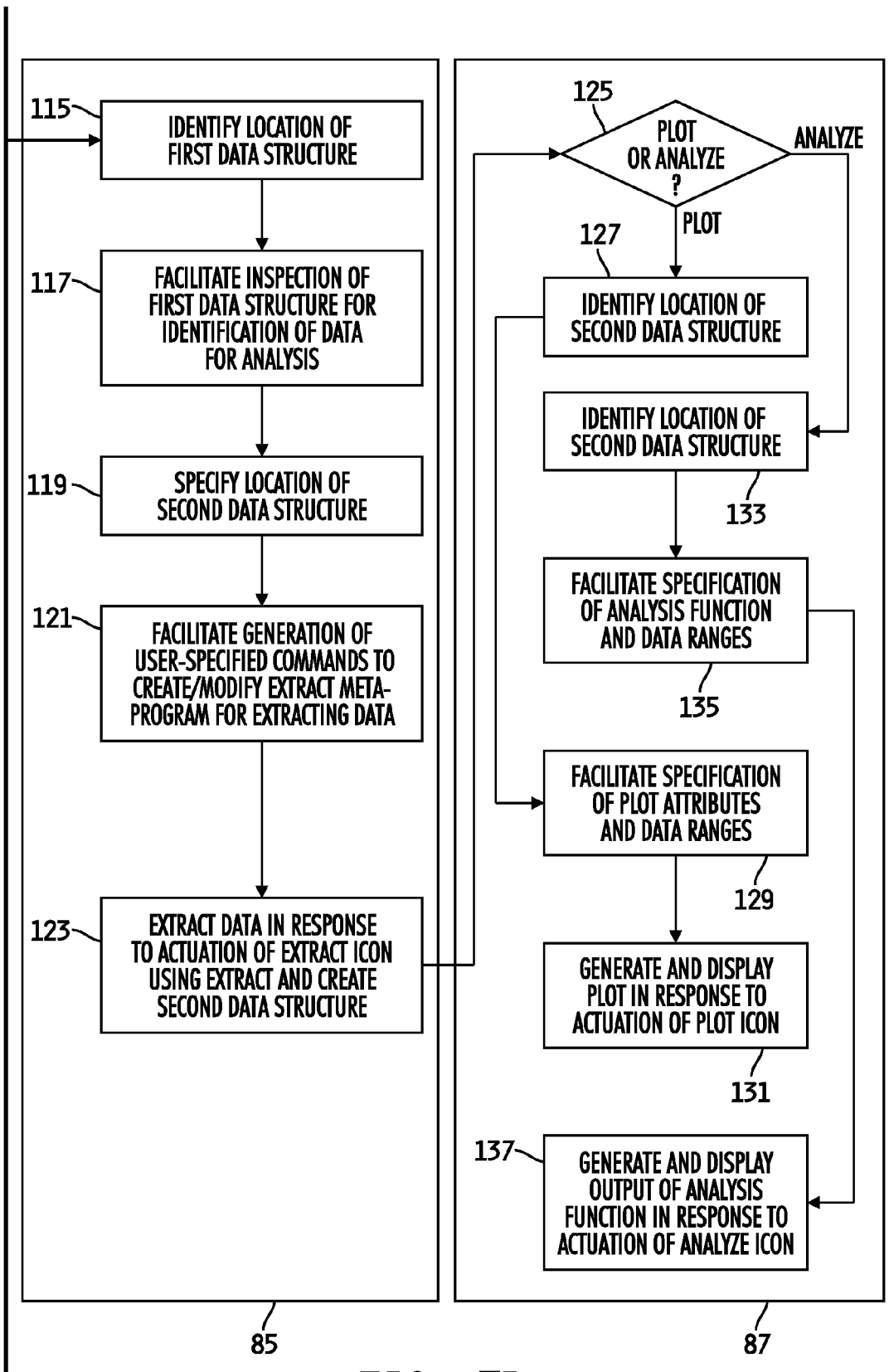

Referring now to FIGS. 3A and 3B, there is depicted a diagram of the various processing sequences and data structures employed by the present system and method. In general, a computer implemented system according to the principles of the present disclosure includes a sort processing sequence 81, an import processing sequence 83, an extract processing sequence 85, and an output processing sequence 87. The functions of these processing sequences involve the user of user interfaces and command sets that are described in more detail below with reference to FIGS. 4 through 11. Sort processing sequence 81 includes code for execution by processor 59 of system 51 for performing a plurality of functions. More specifically, as depicted at block 89, sort processing sequence 81 identifies, based on user input via input devices 55, the location (e.g., directory, folder, etc.) on storage 53 of source files including raw data files, as well as the extension of the source files of interest to the user. When the user actuates a list icon, processing sequence 81 at block 91 generates a listing of source files matching the location/extension criteria, and displays the list to the user. The user may preview selected source files by highlighting or otherwise selecting the files and actuating a preview icon as indicated by block 93. After selecting the raw data file to process, the user (at block 95) interacts with a graphic user interface to generate and/or import a sort meta-program, which is a sequence of commands executed by sort processing sequence 81 to extract data from the raw data file according to the format of the raw data file. The commands cause sort processing sequence 81 to navigate through the raw data file based on the known locations of data and other attributes of the file and to extract selected portions of the file. Next, sort processing sequence 81 verifies at block 97 that the commands of the sort meta-program satisfy certain logical rules as further described below. As indicated by block 99, if the sort meta-program is invalid, sort processing sequence 81 returns to block 95 to permit the user to make modifications to the sort meta-program. Otherwise, sort processing sequence 81 extracts data from the raw data file at block 101 in response to actuation of a sort icon, and creates individual output files for each set of extracted data. Control is then passed to import processing sequence 83.

Import processing sequence 83 includes code for execution by processor 59 of system 51 for performing a plurality of functions. More specifically, as depicted at block 103, import processing sequence 83 identifies, based on user input via input devices 55, the location (e.g., directory, folder, etc.) on storage 53 of the output files created by sort processing function 81, as well as the extension of the output files of interest to the user. When the user actuates a list icon, processing sequence 83 at block 105 generates a listing of output files matching the location/extension criteria, and displays the list to the user. After selecting the output files to process, the user (at block 107) interacts with a graphic user interface to generate and/or import an import meta-program, which is a sequence of commands executed by import processing sequence 81 to extract data from the output files according to the format of the output files. The commands cause import processing sequence 83 to navigate through each of the output files based on the known locations of data and other attributes of the files and to extract selected portions of the files. Next, import processing sequence 83 verifies at block 109 that the commands of the import meta-program satisfy certain logical rules as further described below. As indicated by block 111, if the import meta-program is invalid, import processing sequence 83 returns to block 107 to permit the user to make modifications to the import meta-program. Otherwise, import processing sequence 83 extracts data from the output files at block 113 in response to actuation of an import icon, and creates a first data structure including the extracted data. Control is then passed to extract processing sequence 85.

Like sort processing sequence 81 and import processing sequence 83, extract processing sequence 85 includes code for execution by processor 59 of system 51 for performing a plurality of functions. More specifically, as depicted at block 115, extract processing sequence 85 identifies, based on user input via input devices 55, the location (e.g., directory, folder, etc.) on storage 53 of the first data structure created by import processing function 83. At block 117, extract processing sequence 85 facilitates review of the data included in the first data structure to permit the user to verify the format of the data. At block 119, extract processing sequence 85 receives from the user a name/location of a second data structure, which is created by extract processing sequence 85 in the manner described below. After reviewing the first data structure and specifying the location of the second data structure, the user (at block 121) interacts with a graphic user interface to generate an extract meta-program, which is a sequence of commands executed by extract processing sequence 85 to extract data from the first data structure according to the format of the first data structure. The commands cause extract processing sequence 85 to navigate through the first data structure based on the known locations of data and other attributes of the first data structure and to extract selected portions of the data. At block 123, extract processing sequence 85 extracts data from the first data structure in response to actuation of an extract icon, and creates the second data structure including the extracted data. The data in the second data structure is thereby arranged, according to the extract meta-program, in a format that is convenient for plotting or otherwise analyzing the data. Control is then passed to output processing sequence 87.

Block 125 depicts a user selection of either a plotting function of output processing sequence 87 or an analysis function of output processing sequence 87. If the user selects the plotting function, output processing sequence 87 identifies at block 127, based on user input via input devices 55, the location of the second data structure created by extract processing sequence 85. Then, at block 129, output processing sequence 87 facilitates user interaction with a graphic user interface to define plot attributes and data ranges of the second data structure to be plotted. At block 131, output processing sequence 87 accesses the second data structure and, according to the user-specified attributes and data ranges, generates a plot of the selected data.

Alternatively, if the user selects the analyze function of output processing sequence 87 at block 125, output processing sequence 87 identifies at block 133, based on user input via input devices 55, the location of the second data structure created by extract processing sequence 85. Then, at block 135, output processing sequence 87 facilitates user interaction with a graphic user interface to define analysis functions (such as curve fitting), their associated parameters, and the data ranges in the second data structure on which to perform the analysis. At block 137, output processing sequence 87 accesses the second data structure and, according to the user-specified analysis function and data ranges, generates an output of the analysis of the selected data.

The following example of an implementation of the principles of the present disclosure includes the use of a commercially available spreadsheet application. It should be understood, however, that any of a variety of other environments may be used to implement the concepts and functionality of the principles described herein.

Figure 4:
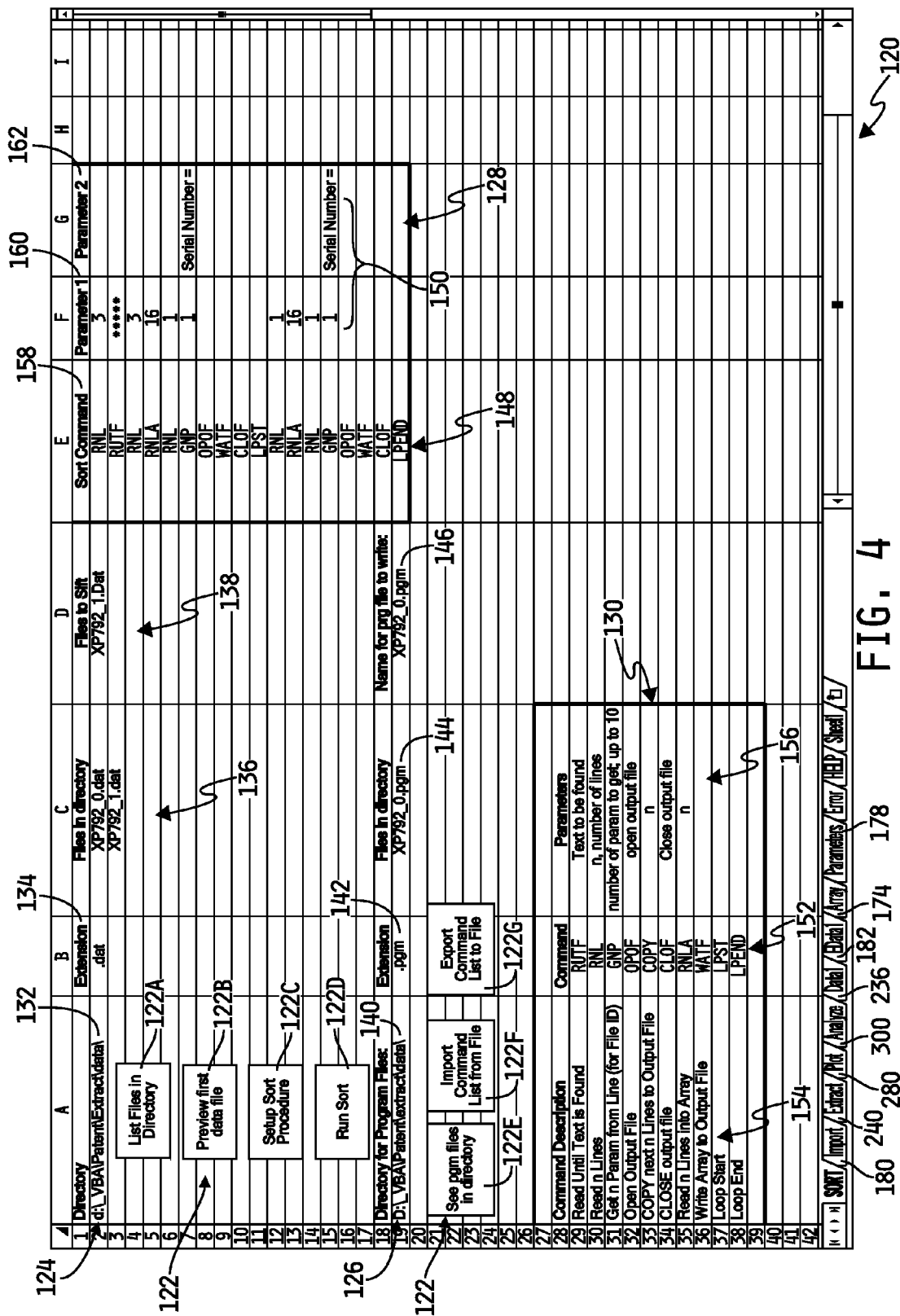
FIG. 4 is a screenshot of a sort page according to one embodiment of the present disclosure.

Referring now to FIG. 4, there is depicted a screenshot of a spreadsheet page including the sort functionality of the present disclosure. Sort page 120 generally includes a plurality of user interface elements including function icons 122, a source files area 124, a program files area 126, a sort commands area 128, and a command description area 130. The plurality of function icons 122 include a list icon 122A, a preview icon 122B, a set up icon 122C, and a run icon 122D, all of which are associated with source files area 124 in the manner described below. The plurality of function icons 122 further includes a list program files icon 122E, an import commands icon 122F, and an export commands icon 122G, all of which are associated with program files area 126 in the manner described below.

Source files area 124 includes a directory cell 132 and an extension cell 134 which are configured to accept user input. It should be noted that any of the cells described herein may display a parameter value (such as a number or a text string) or a relationship with another object external to the cell. The objects external to the cell may include file locations and values stored in other cell. Source files area 124 further includes a files list area 136 and a selected files area 138. Similarly, program files area 126 includes a directory cell 140, an extension cell 142, a files list area 144, and a selected files area 146. As will be further described below, these elements of program files area 126 permit the user to manage lists of commands for reuse.

Sort commands area 128 includes a listing of commands 148. Depending upon the type of command 148, sort commands area 128 may further include one or more parameter values 150 associated with the command 148. Again, as is further described below, these commands 148, with their associated parameter values 150 (collectively referred to as "meta-programs"), operate on the selected source files (such as raw data file 100) to separate portions of each source file into individual collections of data for further processing. Command description area 130 includes a list of available commands 152, a corresponding list of descriptions 154, and a corresponding list of parameter descriptions 156.

To execute the sort functionality, the user first inputs the name of the directory including the raw data files 100 of interest in directory cell 132. As various types of data files may be contained in a directory, the user also inputs the extension of the raw data files 100 of interest in extension cell 134 to designate the particular type of raw data file 100 to be used by sort page 120. Next, the user actuates list icon 122A. Actuation of list icon 122A causes the execution of a plurality of commands programmed to access the selected directory, identify raw data files 100 included in the directory having the selected extension, generate a listing of such files, and display the listing in files list area 136. The user then reviews the listing of raw data files 100 in files list area 136 to determine which of those files the user would like to process further using the principles of the present disclosure. The user may move or copy the names of the raw data files 100 into the selected files area 138. In the process of determining which of the raw data files 100 in files list area 136 to chose, the user may actuate preview icon 122B. Actuation of preview icon 122B causes the execution of a plurality of commands programmed to access the data in the first raw data file 100 in files list area 136, copy that data to a temporary file for display (e.g., into Word Pad), and display the contents of the raw data file 100 to the user. The user can then review the contents to determine if the raw data file 100 should be selected for further processing. In another embodiment of the present disclosure, preview icon 122B is programmed to access and display the contents of any raw data file 100 listed in files list area 136 that is highlighted by the user. Any of a variety of other preview operations may be associated with preview icon 122B.

After the user has populated selected files area 138 with the raw data files 100 chosen for further processing, the user must select (or define) the sequence of commands 148 (i.e., the meta-program) to be performed on the raw data files 100.

These meta-programs are generated in the manner described herein, and stored in a directory. In one embodiment, each meta-program corresponds to a raw data file type, and more specifically includes a plurality of commands 148 programmed to extract raw data from raw data files 100 having a particular format. To obtain a listing of previously generated meta-programs, if any, the user inputs a directory name into directory cell 140 of program files area 126, and an extension name into extension cell 142. In practice, the user may know that a particular meta-program or collection of meta-programs already exist in the selected directory for processing raw data files 100 of the type selected in the process described above. After providing the directory and extension information for the meta-programs, the user actuates program files icon 122E, which causes the execution of a plurality of commands programmed to access the selected directory, identify the meta-programs included in the directory having the selected extension, generate a listing of such meta-programs, and display the listing in files list area 144 of program files area 126 in a manner similar to that described above with reference to list files icon 122A.

After populating files list area 144, the user copies or moves the name of the desired meta-program into selected files area 146 and actuates import commands icon 122F, which causes the execution of a plurality of commands programmed to access the selected meta-program, and copy the commands 148 included therein into the sort commands area 128. As shown in FIG. 4, after actuating import commands icon 122F with the meta-program name "XP792_0.pgm" in selected files area 146, a plurality of commands 148 are displayed under the column header "sort command" 158 and parameter values, if any, corresponding to those commands 148 are displayed in the adjacent columns under the headers "Parameter 1" 160, "Parameter 2" 162, etc. The information in command description area 130 is provided to the user as a convenience to inform the user of the functions associated with the various commands 148, and the definitions of the associated parameters values 150.

In situations where a new raw data file type is to be processed, or when no pre-existing meta-program exists for processing a selected raw data file type, the user may create a meta-program by arranging commands 148 in sort commands area 128 and inputting parameter values 150 for the commands 148 where appropriate. To create a meta-program, the user may print or otherwise display a sample raw data file 100 of the desired raw data file type, identify the format in which the raw data of interest is contained in the raw data file 100, and assemble commands 148 in sort commands area 128 to extract the data of interest based on the format. The manner in which the user assembles commands 148 based on the format of the raw data file 100 will be better understood after reading the description below of execution of the commands 148 to extract data from raw data file 100. After the user assembles the desired commands 148 and parameter values 150 in sort commands area 128, the user may provide a file name for the meta-program in selected files area 146 and actuate export commands icon 122G, which causes the execution of a plurality of commands programmed to copy the contents of sort commands area 128 into a new meta-program file for later use. Alternatively, instead of populating selected files area 146 with the desired meta-program filename, the user may be prompted to provide a directory name or other target storage location for the new meta-program, as well as a file name.

Whether the user imports a meta-program or creates one, the user may actuate the setup icon 122C, which causes the execution of a plurality of commands programmed to verify that the arrangement of commands 148 in sort commands area 128 and the inputted parameter values 150 associated with those commands 148 do not violate certain logical rules. For example, execution of setup icon 122C verifies that the list of commands 148 does not include a command that defines the beginning of a loop of commands (as described below) without including a command 148 defining the end of the loop. Additionally, setup icon 122C compares the parameter values 150 associated with the listed commands 148 to ensure that the parameter values 150 are present where necessary, and are of the expected type and value where appropriate.

Continuing with the example depicted in the figures, after the user imports a meta-program using import commands icon 122F, the user may actuate run icon 122D. Actuation of run icon 122D causes the execution of the commands 148 listed in sort commands area 128, in the order listed, to process each of the raw data files 100 included in selected files area 138 (here, raw data file "XP792_1.dat." The first command 148 listed in sort commands area 128 is the RNL command, which as shown in command description area 130 performs the function of reading N lines of information in raw data file 100. The associated parameter value 150 is 3, which specifies that three lines of information are to be read. Referring back to FIGS. 1A, 1B, and 1C, the purpose of the RNL command in this context is to advance past the initial two lines 164, 166 contained in raw data file 100, which will always be present according to the format of raw data file 100, and include information that will not be used in the processing of raw data file 100 as described below. Essentially, the RNL command is used here as a skip command to move a virtual pointer through raw data file 100 to a location suitable for performing the next command 148 listed in sort commands area 128.

The next listed command 148 is the RUTF command, which performs the function of reading through raw data file 100 until finding the text string provided as the parameter value 150 corresponding to the RUTF command. Here, the parameter value 150 is "**." This parameter value 150 was provided because, according to the format of raw data file 100, after moving beyond lines 164, 166, the first occurrence 168 of the string "**" will occur after header block 102, which has been determined not to include information of interest to the user. Again, the RUTF command is used in this context as a skip function, to move the virtual pointer through raw data file 100 past header block 102. Another RNL command is then executed (with the parameter value of 3) to move the virtual pointer past the initial header information 170 of first data set 104A. At this point in the execution of the meta-program listed in sort commands area 128, raw data file 100 has been read to the line designated 172 in FIG. 1B.

The next listed command 148 in sort commands area 128 is the RNLA command, which performs the function of copying N lines from raw data file 100 into an array, which is a temporary file or spreadsheet page for holding the information until an output file is generated as described below. The associated parameter value 150 for the parameter N in this example is 16. Accordingly, sixteen lines of data, beginning with line 172 are copied from raw data file 100 into an array location, which in this example is another spreadsheet page 174 named array (see FIG. 4). The raw data copied during the execution of the RNLA command includes all of the data associated with data set 104A. More specifically, all of the values in parameter name column 108, each of the four data columns 110A-D and pass/fail indicator columns 112A-D, range column 114, and units column 116 are copied into Array page 174 for further processing as described below.

Next, another RNL command is executed, with a parameter value 150 of 1. This advances the virtual pointer associated with the meta-program to line 176 of raw data file 100. After advancing to line 176, a GNP command is executed, with the parameter values 150 of 1 and "Serial Number=." As indicated in command description area 130 of FIG. 4, the GNP command performs the function of obtaining a parameter (or multiple parameters) from raw data file 100 in the current line of the virtual pointer. Here, the first text string following the parameter 150 "Serial Number=" in the current line 176 will be copied to another page 178 named "Parameters" as shown in FIG. 4. The text string in this example is "W16_001" which corresponds to the serial number of the item tested that generated the data included in data set 104A.

The next three commands, OPOF, WATF, and CLOF perform the functions of opening an output file for storage of the contents of Array page 174, writing the contents of Array page 174 to that output file, and closing the output file, respectively. The name of the output file is the same as the name of the input file (i.e., the raw data file 100 being operated upon from the files included in selected files area 138) plus the text string read by the GNP command described above (i.e., the text "W16_001" stored in Parameters page 178).

The next command is the LPST command, which as indicated in command description area 130, performs the function of defining the beginning of a loop of commands 148. The commands 148 listed in sort commands area 128 after the LPST command and before the LPEND command, which defines the end of the loop, are executed repeatedly until the end of raw data file 100 is reached. More specifically, the RNL command advances the virtual pointer one line in raw data file 100. The RNLA command reads another sixteen lines of data (i.e., the next data set 104B) into Array page 174. The next RNL command advances the virtual pointer another line. The GNP command copies the serial number of the copied data set 104B into Parameters page 178. Finally, the OPOF, WATF, and CLOF commands create a separate output file for each data set 104, with a name corresponding to the serial number associated with the data set 104. In this manner, all of the data sets 104 are read from raw data file 100 and included in separate output files having names corresponding to the serial numbers of the test items that generated the data sets 104.

As should be understood from the foregoing, the particular arrangement of commands 148 in sort commands area 128 and the selection of parameter values 150 corresponds precisely to the known format of the information in the raw data file 100 being processed. For any format of raw data file 100, the user may define a meta-program in the manner described above that, when executed, generates output files with names and contents as desired by the user. Thus, sort page 120 may be used to operate on raw data files 100 with predefined meta-programs or to create meta-programs for later use in processing raw data files 100.

Figure 5:
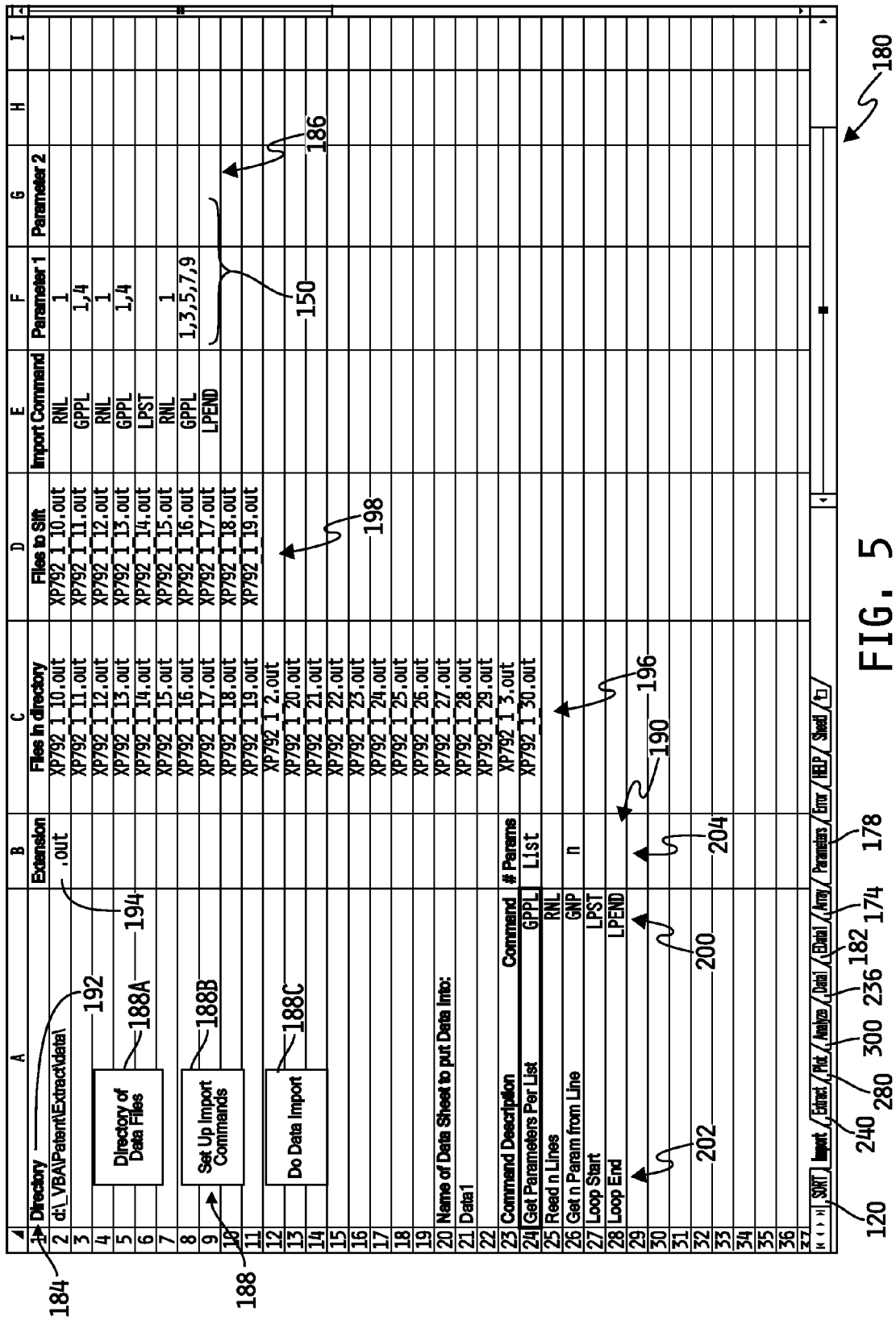
FIG. 5 is a screenshot of an import page according to one embodiment of the present disclosure.

Turning now to FIG. 5, an import page 180 is depicted which is configured to import selected data from selected output files created using the sort functionality of sort page 120 described above. In general, the sort functionality extracts selected data from raw data files 100 and creates output files including the individual extracted data sets 104. The import functionality operates on those output files to assemble other arrangements of the data contained therein and store those arrangements in a temporary storage location, such as another spreadsheet page 236 named Data1 as shown in FIGS. 4 and 5. These data arrangements are created according to the commands 148 included on import page 180, and are prepared for the purpose of facilitating graphical presentation of the data included therein or some other presentation format that permits analysis of the data.

Import page 180 generally includes a plurality of user interface elements including source files area 184, an import commands area 186, a plurality of function icons 188, and a command description area 190. Source files area 184 includes directory cell 192, extension cell 194, files list area 196, and selected files area 198. Import commands area 186 includes a plurality of commands 148 and corresponding parameter values 150 listed in tabular format similar to that of sort commands area 128 of FIG. 4. Plurality of function icons 188 includes list icon 188A, setup icon 188B, and run icon 188C. Finally, command description area 190 includes a list of available commands 200 and their associated descriptions 202 and parameter descriptions 204.

In operation, the user inputs the name of the directory containing the output files generated by sort page 120 in directory cell 192 of source files area 184 and the extension of the output file names of interest in extension cell 194. When the user actuates list icon 188A, a plurality of commands are executed that are programmed to access the named directory, identify files having the designated file extension, create a list of the output files, and populate files list area 196 with the output file names. The user then moves or copies the names of output files desired for further processing into selected files area 198. Although import page 180 does not include a preview icon as shown on sort page 120 of FIG. 4, it should be understood that in an embodiment of the present disclosure, such a preview icon may be provided to assist the user in selecting the output files listed in files list area 196 for inclusion in selected files area 198.

At this point in the process, the user may use another application (e.g., Word Pad) to view one of the selected output files in selected files area 198 for the purpose of creating a list of commands 148 in import commands area 186 for further processing of the data in the output files. Alternatively, the user may print one of the output files to view its contents and determine the manner in which to further process the data. In this example, the output files contain the extracted portions of raw data file 100 as a result of the sort functionality described above.

As shown in FIG. 6, each output file 234 includes sixteen lines of data arranged as data block 206. In this example, the output file is named "XP792_1_W16_001.out." The first two lines 208, 210 of data correspond to parameter names "Ips 2" and "Ips 3," which are power supply measurements for the integrated circuit tested in the manner described above. As the integrated circuit uses a shared power supply circuit for each of the four operational amplifiers contained therein, only two measurements are taken. Thus, for these two lines 208, 210 of data, columns 212, 214, 216, 218 are populated, providing a pass/fail indication for the power supply measurements, the measurements themselves, the range values, and the units, respectively. Each of the remaining parameter names listed in parameter name column 220 include a pass/fail indication in pass/fail indicator column 212, a measurement for the first operational amplifier in column 214, pass/fail indications and measurements for each of the other three operational amplifiers in columns 222-232, range values in column 216 and units values in column 218.

Using the format of output file 234 depicted in FIG. 6 as a guide, the user constructs a listing of commands 148 in import command area 186 in a manner similar to that described above with reference to sort commands area 128. In this example, we assume that the user is interested in the power supply measurements taken for the operational amplifiers tested, and each of the measurements for all four operational amplifiers for all other parameters tested. The user is not interested in the pass/fail indicators or the range or units values. The first command 148 in this example is the RNL command with a parameter value of 1, which performs the function of advancing the virtual pointer to the first line 208 of the output file (i.e., the line beginning with the parameter name "Ips 2"). Next, the GPPL command performs the function of obtaining values listed in the current line. The associated parameter 150 for this GPPL command is 1,4, which causes the command to obtain the first and fourth quantities listed in line 208. Here, the first quantity is "2" because there is a space between the "Ips" and the "2" at the beginning of line 208. The fourth quantity is "0.8689." The GPPL command stores these values in another page 236 of the spreadsheet named "Data 1," as shown in FIGS. 4 and 5. Next, a RNL command advances the virtual pointer 1 line. The fourth command is another GPPL command with the parameter 1,4. Again, this GPPL command extracts the first and fourth quantities in the current line (i.e., line 210) and writes them to the Data 1 page 236 in the next row. The fifth command 148 is a LPST command, which indicates the beginning of a loop, the end of which is designated by the LPEND command at the end of the list. Between these commands 148 are an RNL command with a parameter of 1, which causes the virtual pointer to advance to the next line of the output file, and another GPPL command. This GPPL command has a parameter of 1, 3, 5, 7, 9. As should be apparent from the foregoing, the combination of these two commands 148 between the LPST and LPEND commands causes the extraction of the parameter name, and the associated value for each of the four operational amplifiers. It should be further understood that the user may designate GPPL parameters to extract more or fewer values as is desired for the final analysis of the data. As such, import page 180 advances through all of the data in the current output file 234, writing the parameter names and values to Data 1 page 236 until the end of the file 234 is reached.

If multiple file names are included in selected files area 198 of import page 180, then the above described command set is repeated for each listed output file 234 until the last file 234 is processed. As such, all of the desired data is extracted from the selected output files 234 and stored in Data 1 page 236, with a blank row in between each arrangement of data. A truncated data arrangement 238 from Data 1 page 236 is provided in FIG. 7 for the example described herein.

Data arrangement 238 of FIG. 7 is the input file for the extract functionality of the extract page 240 of FIG. 8. In one embodiment, extract page 240 is used to create tabular arrangements of data in a format suitable for graphic presentation. In this example, one of the parameters, Vos, included in data arrangement 238 for each serial number of item tested, is extracted and arranged such that one column includes the serial number of the item tested and the adjacent column includes the Vos values for that item, one value for each operational amplifier in the package. In this manner, a graphical representation of the Vos values of the various items tested may be created.

Referring now to FIG. 8, extract page 240 generally includes a plurality of user interface elements including an extract command area 244, an extract icon 246, a command description area 248, a source data sheet cell 252, and a destination cell 254. In general, extract page 240 is used to remove portions of the data in Data 1 page 236, and store those selected portions in another temporary storage location, such as spreadsheet page 182 named EData 1 in this example. The data is stored in EData 1 page 182 in a format suitable for graphically or otherwise presenting the data for analysis and evaluation.

In operation, after populating cells 252 and 254, the user assembles a list of commands 148 in extract command area 244 to specify the data desired for further processing. When the user actuates extract icon 246, the commands 148 listed in extract command area 244 are executed sequentially for the source data sheet, Data 1 page 236. The user in this example first includes a GPN command with a parameter of Vos. Referring back to FIG. 7, this command causes the virtual pointer to move through Data 1 page 236 until it locates the parameter Vos as indicated by the numeral 260. The next command, LPST, designates the beginning of a loop in the manner described above. The next four commands are repeated until the end of Data 1 page 236 is reached. The XFHL command extracts text from header information according to the associated parameter value, which is 3 in this example. As shown in FIG. 7, each data arrangement 238 includes a text header 262, such as "XP792_1_10.out" for the first data arrangement 238A. This text header 262 is obtained from the filename of the first file listed in selected files area 198 of import page 180 of FIG. 5. The XFHL command with a parameter 3 causes the program to search text header 262 for the third text string, as separated by underscores. Here, the extracted text is "10," which specifies the serial number for the tested item. The text "10" is then placed in EData 1 page 182 in the location 264 shown in FIG. 9. It should be understood, however, that when the original, raw data file 100 is created, the operator may place additional information in text header 262 (i.e., in addition to serial number) to indicate, for example, the conditions under which the test data was obtained (e.g., temperature, vibration, etc.). The next command, ANR, with a parameter of 3 causes the virtual pointer to advance through Data 1 page 236 three rows. This location is the Vos parameter 260 in first data arrangement 238A. The following XYPL command, with parameter 2,3, 4,5 causes the extraction of the second, third, fourth, and fifth values in the current row of source Data 1 page 236, and the placement of those values in row 268 adjacent the text "10" as shown in FIG. 9. The final command in the loop is the FNH command, which advances the virtual pointer through Data 1 page 236 until it locates the next text header 262 (i.e., the header for data arrangement 238B corresponding to the second item tested). Thus, the meta-program shown in FIG. 8 causes the extraction of all Vos values for each data arrangement 238 in Data 1 page 236, and the arrangement of those values in a row following their associated serial number as shown in FIG. 9.

Referring now to the Plot page 280 of FIG. 10, there is shown a plurality of user interface elements including a source sheet area 282, a property column 284, setting/value column 286, an x-data column 288, a y-data column 290, a plot icon 292, and an add data icon 294. The user specifies the name of the page containing the output from the extract functionality described above in source sheet area 282. In this example, the page name is EData 1. Property column 284 includes a plurality of attribute identifiers 296 for the graphical presentation of the data in EData 1 page 182. The user specifies the desired attributes for each attribute identifier 296 by populating setting/value column 286. Here, the user has specified that the title of the graph will be "XP792 Voltage Offset." The x-axis label will be "Stress," and the y-axis label will be "Volts." The minimum and maximum values for the graph are designated in setting//value column 286 adjacent the respective attribute identifiers 296. If the user desires a logarithmic scale for either the x axis or the y axis, the user populated the adjacent cells with a value of 1. Otherwise, as shown in FIG. 10, a value of 0 will result in a linear scale. The xZeroInt attribute sets the location on the y-axis for the zero value of the x-axis. Similarly, the yZeroInt attribute sets the location of the zero of the y-axis along the x-axis. The nColorGroup attribute sets the color of the data set to be added. The GraphName attribute permits the user to designate the name of the file containing the graph. Finally, the npts attribute sets the number of data points to be plotted.

The values in x-data column 288 and y-data column 290 specify which columns in EData 1 page 182 include the data the user desires to use for the graphical presentation. Here, the user has specified that the data range for the x-axis of the graph is first column 261 in EData 1 page 182 of FIG. 9 (i.e., the serial number indicators). The user has further selected the third column 263 of EData page 182 for the y-axis Vos values, which corresponds to the measurements taken for each second operational amplifier in each package tested. It should be understood that the user may designate multiple columns of data for the y-axis to plot the values, for example, for the other operational amplifiers. When the user actuates the plot icon 292, a plurality of commands are executed such that the x and y axis data in EData 1 page 182 as specified are used to generate a plot having attributes as specified by the information in setting/value column 286. After a plot has been created in this manner, the user may modify the parameter in y-data column 290 and actuate add data icon 294 to include additional data in the existing plot. In addition, the user may modify the name in source sheet area 282 as well as the y-data parameter and use add data icon 294 to include data on the existing plot from a different source data page.

Figure 11:
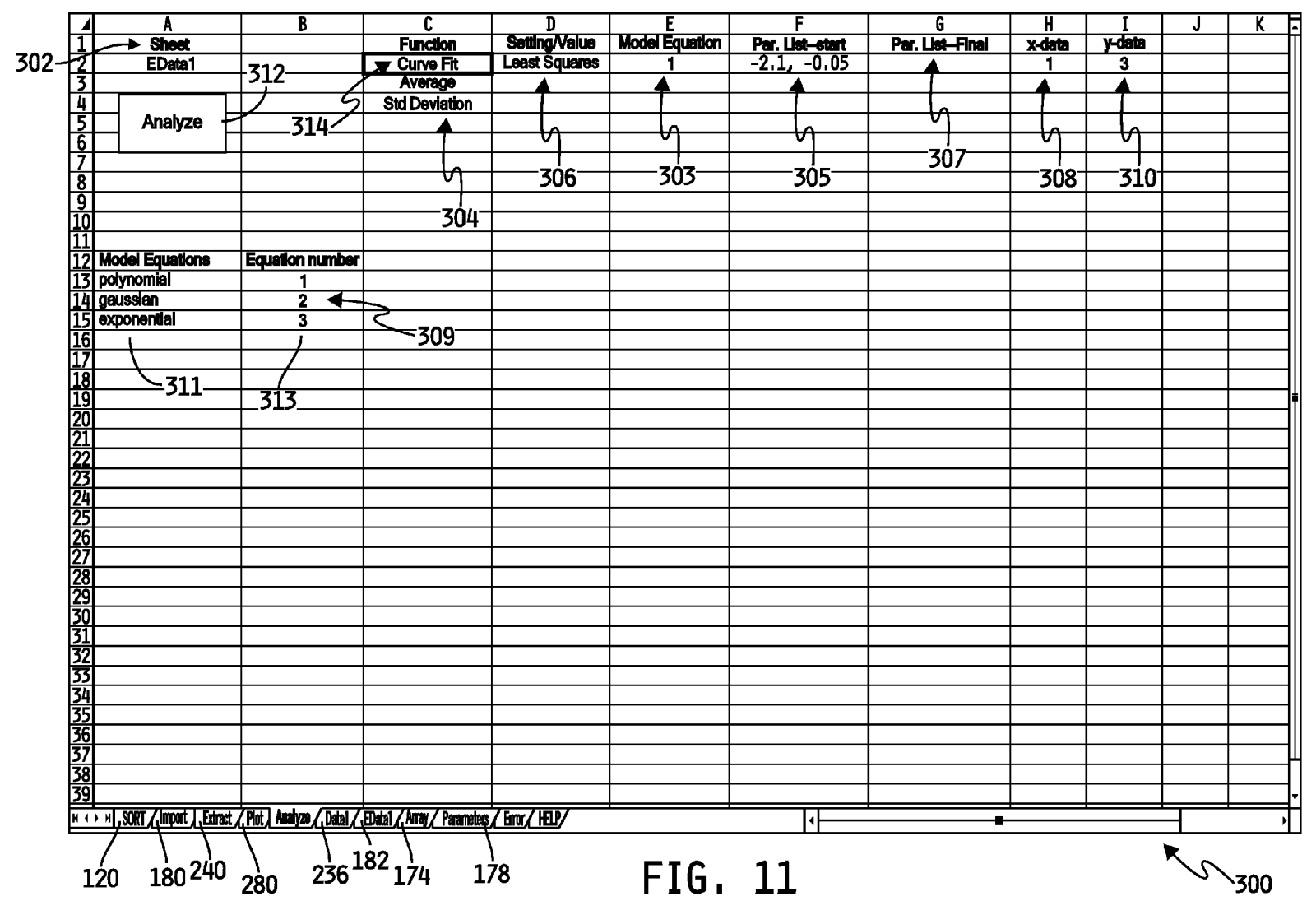

Referring now to FIG. 11, an Analyze page 300 is shown including a plurality of user interface elements including a source sheet area 302, a function column 304, a setting/value column 306, a model equation column 303, a starting parameters column 305, a final parameters column 307, a function identification area 309, an x-data column 308, a y-data column 310, and an analyze icon 312. In operation, the user specifies the name of the page containing the output from the extract functionality described above in source sheet area 302. In this example, the source sheet is EData 1 page 182. Function column 304 includes a plurality of different analysis functions 314 which the user may select for analyzing the data in the source page as specified in x-data column 308 and y-data column 310. For example, function column 304 includes a curve fit function 314. When the user highlights curve fit function 314, function identification area 309 is populated with any model equations available for performing the curve fit function. Here, a plurality of model equations 311 are listed along with corresponding equation numbers 313. The user selects a model equation by inputting the corresponding equation number 313 in model equation column 303. Additionally, as the least squares fit requires user-defined starting parameters, the user enters a comma-separated list of those parameters in starting parameters column 305. In the example shown, the user has provided two parameters, indicating a linear fit. As should be apparent to one skilled in the art, three parameters are required for a quadric polynomial fit, four parameters are required for a cubic fit, and so on. After the equation number and starting parameters are entered, the user actuates analyze icon 312.

When the user actuates analyze icon 312, a plurality of commands are executed such that the selected function with the provided parameters is performed on the selected data. In one embodiment of the present disclosure, this yields two results. The first is a set of final fitting parameters which are displayed in final parameters column 307. The second result is a set of model data points having the same x coordinates as the data specified in x-data column 308 and y coordinates according to the model equation with final fitting parameters which are displayed in final fitting parameters column 307. This set of model data points may, in one embodiment, be provided in the first available column of the input data sheet specified in source sheet area 302. After performing an analysis function as described above, the user may return to plot page 280 and use it to graphically display the fitted curve over the data to which the curve fitting equation was applied.

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

What is claimed is:

1. A computer implemented system for generating a graphical representation of selected data from a raw data file having a plurality of data sets arranged according to a fixed format, including:
   a machine readable, non-transitory, digital media storing a plurality of machine readable processing sequences comprising:
      a first plurality of processing sequences operable to facilitate a first plurality of user interactions comprising a plurality of graphical user interface sections and processing sequences and to generate pattern based file translation activities comprising:
      a graphical user interface section adapted to display one or more source files on a digital file storage device, said source files having a first file format;
      a graphical user interface section adapted to facilitate selecting one or more said source files having said first format data files using said first graphical user interface and load said source files for parsing and translation from said first format to a second file data format:
      a graphical user interface section adapted to facilitate input and display of a set of user input or selected file name extensions in a graphical user interface section for selection or filtering of subsets of said selected one or more said source files;
      a graphical user interface section adapted to facilitate displaying a list of available commands for a plurality of user input data formatting instructions,
      a graphical user interface section adapted to facilitate user input and storing of a first plurality of parse lists, each of said first plurality of parse lists comprising a sequence of selected said user input data formatting instructions associated with data conversion of one or more user selected first format data files, said first plurality of parse lists are stored into a first plurality of parse list script files;
      a graphical user interface section adapted to facilitate selecting one or more said first plurality of parse list script files;
      a graphical user interface section adapted to facilitate user selection of one or more said first format data files and associating said user selected first format data files with said selected parse list script files to perform said data conversion; and
      a graphical user interface section adapted to facilitate selective execution of said selected parse list script files on said user selected first format data files for conversion into one or more said second format data output files;

a second plurality of processing sequences operable to facilitate a first plurality of user interactions comprising a plurality of graphical user interface sections and processing sequences to including importing said selected data stored in said one or more second format data output files, comprising:

a graphical user interface section adapted to facilitate selectively displaying and selecting said second format data output files;

a graphical user interface section adapted to facilitate displaying available commands for a plurality of data import instructions;

a graphical user interface section adapted to facilitate user input and storing of a second plurality of parse lists, each of said second plurality of parse lists comprising a sequence of user input said data import instructions associated with data conversion of one or more user selected second format output data files into a first data structure, said second plurality of parse lists are stored into a second plurality of parse list script files;

a graphical user interface section adapted to facilitate user selection of one or more said second format data output files and associating said user selected second format data files with said selected second plurality parse list script files to perform said data conversion;

a graphical user interface section adapted to facilitate selective execution of said selected second plurality parse list script files on said user selected second format data files for conversion of said one or more selected second format data files into said first data structure; and a graphical user interface navigation section or bar that is displayed with at least some of said plurality of graphical user interface sections that is adapted to permit a user to select between at least two said graphical user interface sections;

a third plurality of processing sequences that extracts data from each data set of the source data files data file according to one or more selected said first plurality of parse lists and stores the extracted data in a plurality of said second format data output files having a common output file format;

a fourth plurality of processing sequences that extracts data from at least two of the plurality of second format data output files according to one or more selected said second plurality of parse lists and stores the extracted data in said first data structure having a first data structure format;

a fifth plurality of processing sequences that extracts data from the first data structure according to a third plurality of commands specified by the user in a graphical user interface section adapted to facilitate user input and storing of said third plurality of commands based on the first data structure format and stores the extracted data in a second data structure having a second data structure format;

a sixth plurality of processing sequences that generates a graphical representation of user-specified data in the second data structure;

wherein the third plurality of processing sequences further responds to actuation of a sort list icon displayed by said graphical user interface adapted to display and select said source data file and further is adapted to display a filename of the source data file, thereby permitting the user to select the source data file as a source file;

wherein the plurality of data sets of at least one of the source data files includes data relating to a different item and an item identifier, and are arranged according to the fixed format in a repeating sequence;

wherein the third plurality of processing sequences further verifies that the user input data formatting instructions in said first plurality of parse lists does not violate a set of logical rules;

wherein the third processing sequence displays the contents of the source data file in response to actuation of a preview icon shown in one or more of said graphical user interface sections associated with said first plurality of processing sequences.

2. The system of claim 1 wherein the user input data formatting instructions stored in said first plurality of parse lists includes a command for locating a virtual pointer in the source data file relative to identified content within the source data file, a command for advancing the virtual pointer through the source data file a user-defined number of lines, a command for copying a user-specified quantity of data into a temporary storage location, a command defining a beginning of a loop of commands, and a command defining an end of the loop of commands.

3. The system of claim 1 wherein the fourth plurality of processing sequences further responds to actuation of an import list icon displayed by said a graphical user interface section adapted to facilitate selectively displaying and selecting said second format data output files by displaying filenames of the second format data output files, thereby permitting the user to select the at least two said second format data output files from the displayed filenames.

4. The system of claim 1 wherein the first data structure includes a first arrangement of extracted data from one of the second format data output files separated by a blank row from a second of extracted data from another of the second format data output files.

5. The system of claim 1 wherein the second data structure includes a tabular arrangement of extracted data wherein one column in the tabular arrangement includes data from the first arrangement relating to a variable and another column in the tabular arrangement includes data from the second arrangement relating to the variable.

6. The system of claim 1 wherein the sixth processing sequence enables user-selection of attributes of the graphical representation.

7. The system of claim 1 further including a seventh processing sequence that performs one of a plurality of user-selected analysis functions on user-specified data in the second data structure.

8. The system of claim 7 wherein the plurality of user-selected analysis functions includes a curve fit function.

* * * * *